2,785,246
Patented Mar. 12, 1957

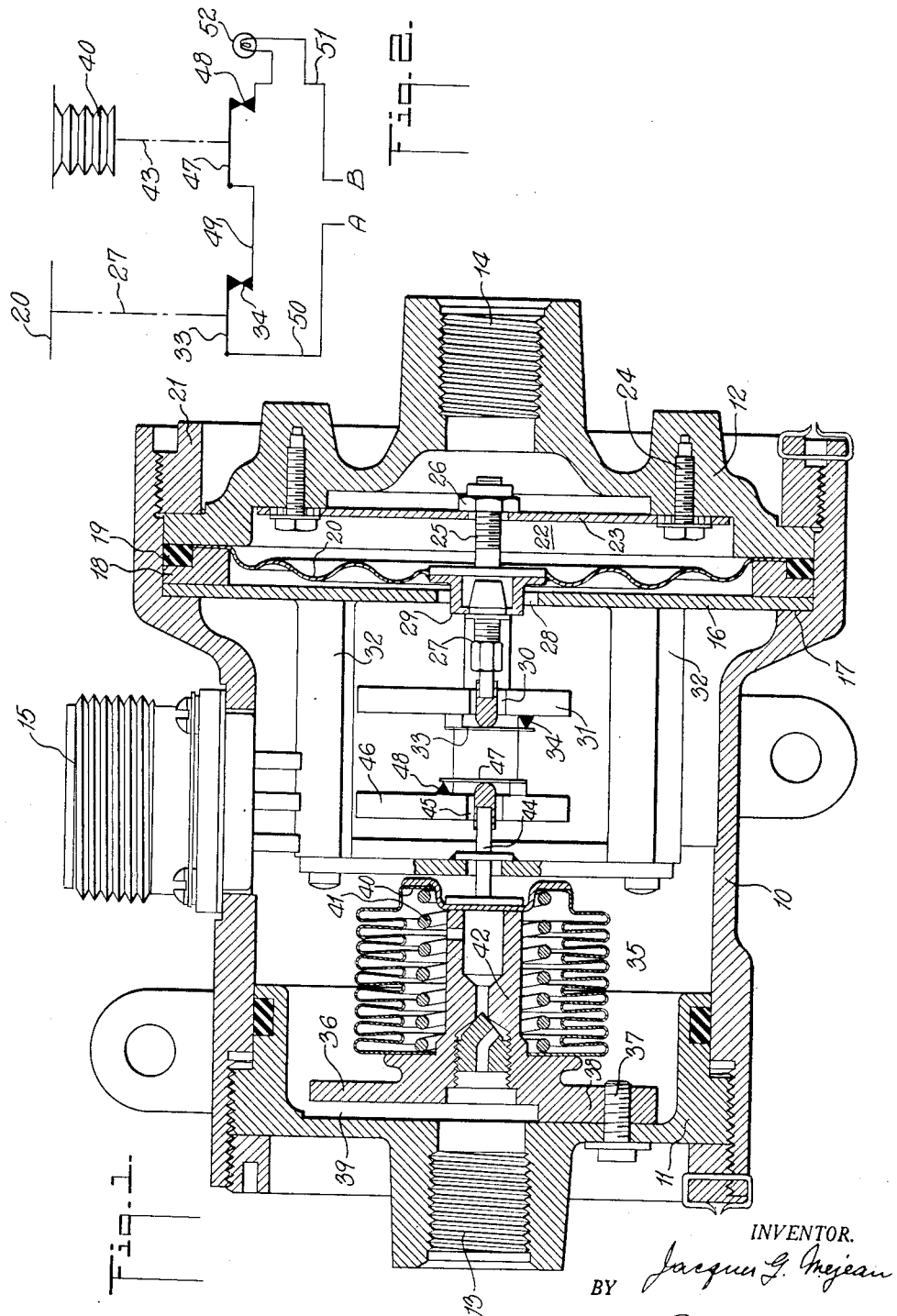

2,785,246

ALTITUDE SPEED SWITCH

Jacques G. Mejean, Greenwich, Conn., assignor to The Aerotec Corporation, Greenwich, Conn., a corporation of Connecticut Application January 20, 1956, Serial No. 560,323

4 Claims. (Cl. 200—81.5)

My present invention relates to an altitude speed switch, that is, to an electric switch system which closes an alarm or actuating circuit when the speed and altitude fall below a predetermined point.

The switch of my invention is accordingly one that alerts or informs the pilot of aircraft when he is flying at an altitude less than a predetermined level, for example, at an altitude below 10,000 feet and at less than a predetermined minimum speed, for example, below 178 knots. These conditions take place on a landing approach and alert the pilot so that he may make sure his landing gear is lowered. The switch of my invention comprises a compact assembly of the various elements in a single housing.

In the switch of my invention two switch elements are mounted in opposed positions on supports transverse of an enclosing housing. The switch elements have snap type of contacts. One switch element is operated by an altitude bellows to close the switch when the atmospheric pressure is that of the minimum altitude. The other switch element is operated by a diaphragm actuated by the dynamic pressure of the aircraft as determined by a Pitot tube or equivalent detecting device. The switch elements are in series, so that when either switch is open the circuit is open.

The various features of my invention are illustrated, by way of example, in the accompanying drawings, in which—

Fig. 1 is a longitudinal section of an altitude speed switch embodying the invention, and Fig. 2 is a wiring diagram illustrating the use of the invention.

In the embodiment illustrated in the drawings, the elements of the switch and the actuating mechanisms are mounted in a housing 10, shown in the drawings as of tubular form closed at one end by a wall 11 screw threaded into the housing and at the opposite end by a wall 12. The wall 11 has an inlet opening 13 and the wall 12 has an inlet opening 14. The housing has an opening 15 though which electric conductors may pass.

Spaced inwardly of the wall 12 is a plate 16 supported at its outer edge against an internal shoulder 17 of the housing and held against the shoulder by a spacing ring 18 having a sealing ring 19. Clamped between the spacing and sealing rings 18, 19 and the outer peripheral margin of the wall 12 is the peripheral margin of a flexible diaphragm 20. The wall 12 is pressed against the rings 18, 19 and the latter against the plate 16 and shoulder 17 by an externally threaded ring 21, threaded into internal screw threads of the end of the housing to form a fluidtight seal between the diaphragm 20 and the end wall 12 and enclose a chamber 22 to receive the dynamic pressure delivered through the opening 14. Also within the chamber 22 is a flat beryllium spring 23 secured to an internally stepped shoulder of the end wall 12 by screws 24. The central part of the spring 23 is coupled to the diaphragm 20 by a stem 25 and a lock nut 26 which adjusts the distance of the diaphragm from the spring 23 and accordingly adjusts the pressure in the chamber 22 required to move the diaphragm to a predetermined distance inwardly.

The inward movement of the diaphragm 20 is transmitted to an electric switch by means of a stem 27 extending from the diaphragm through an opening 28 in the plate 16. The stem is mounted on the diaphragm 20 by a collar 29 which limits the inward movement of the stem and diaphragm as it abuts the margin of the plate 16 about the opening 28. The stem 27 projects through an opening 30 in an insulating plate 31 supported by brackets 32 extending inwardly from the plate 16, and carrying a conducting leaf 33 mounted on the insulating plate 31 and a contact terminal 34. The leaf 33 is normally pressed into contact with the terminal 34 to close the circuit. When the stem 27 is shifted axially inwardly by dynamic pressure on the diaphragm 20 it presses the leaf from the contact 34 and opens the circuit. The leaf 33 may move with a snap action well known in the art, the specific construction of switches of this type being known in the art.

It will be apparent from the above that when the speed of the aircraft is sufficient to create the required dynamic pressure it forces the diaphragm 20 inwardly to open the switch, but when the speed of the aircraft decreases until the resulting dynamic pressure is insufficient to deflect the diaphragm against the force of the spring 23 sufficiently to move the spring 33 away from the contact terminal 34, the switch is closed.

A second switch in series with the switch 33, 34 is similarly controlled by the static atmospheric pressure at the altitude of the aircraft to close when the aircraft is at a lower altitude, and higher atmospheric pressure, and to open at a higher altitude, and lower atmospheric pressure.

The mechanism for actuating the second switch comprises an evacuated bellows 35 mounted at one end on a platform 36 secured by screws 37 to the inner face of the end plate 11 and spaced therefrom by feet 38 to provide a passage 39 from the inlet 13 to the interior of the housing. The free end 40 of the bellows is pressed away from the fixed end by a helical spring 41 but may be collapsed by atmospheric pressure entering the inlet 13 until the free end is supported on a post 42 extending longitudinally within the bellows from the supporting platform 36.

At lower altitudes the bellows 35 is collapsed to support its free end 40 on the post 42 but as the aircraft rises to higher altitudes and the atmospheric pressure decreases, the spring 41 distends the bellows and moves the free end away from the fixed end. The movement of the free end of the bellows is transmitted through a transmission rod 43, secured to the free end of the bellows and extending in the direction of movement through a hole in a beam 44 joining the ends of the brackets 32 and thence through an opening 45 in an insulating plate 46 of a second switch. As the bellows 35 expands at higher altitudes and lower atmospheric pressures, it moves the end of the rod 43 against a leaf contact 47 and separates it from a fixed contact terminal 48 thereby opening the switch. As the aircraft descends to lower altitudes and higher atmospheric pressures, an altitude is reached at which the static atmospheric pressure collapses the bellows sufficiently to withdraw the rod 43 from contact with the spring leaf 47 whereupon the switch closes. The switch 47—48 may be of the same type as the switch 33—34. The pressure and altitude at which the switch 47—48 will open may be adjusted by screwing the plate 11 into or out of the housing.

The switches 47—48 and 33—34 may be connected in series in an alarm or actuating circuit in any suitable manner. In the diagrammatic circuit of Fig. 2 the switches 33—34 and 47—48 are connected in series by a connecting lead 49 in a circuit comprising leads 50 and 51 to a source of electric energy and an alarm such as the lamp 52 or an element for energizing a control element or alarm.

Briefly the apparatus operates as follows:

When the aircraft is above the lower altitude limit the atmospheric pressure is sufficiently low to expand the bellows 35 and hold the switch 47—48 open by means of the rod 43. As the aircraft descends below this altitude limit, for example 10,000 feet, the bellows is collapsed to permit the switch to close. Similarly when the speed is sufficiently high, for example above 178 knots per hour, so that the dynamic pressure on the diaphragm holds the switch open, the circuit is open. When the speed, and with it the dynamic pressure, decreases below this limit the switch 33—34 closes. When both switches are closed the circuit is closed through the alarm or other controlling device.

Having described my invention, what I claim is:

1. Altitude and speed indicating apparatus for aircraft which comprises a housing having an inlet to receive dynamic air pressure and an inlet for static air pressure, a flexible diaphragm enclosing a part of said housing to form a dynamic pressure chamber in communication with said dynamic pressure inlet, a spring to restrain the flexing of said diaphragm by the dynamic pressure in said chamber, an evacuated bellows having one end fixed in said housing and the opposite end movable under changes in atmospheric pressure, a spring in said bellows acting on said movable end in opposition to atmospheric pressure, a pair of normally closed electric switches connected in series in said housing, a transmission from said diaphragm to open one of said switches when moved by dynamic pressure against its restraining spring and a transmission from the free end of the bellows to the other of said switches to open said switch as said bellows distends under a decrease in the static pressure in said housing.

2. The indicating apparatus of claim 1 in which the restraining spring for said diaphragm is a flat spring and in which said diaphragm is connected to said spring by an adjustable connector to vary the distance of said diaphragm from said spring.

3. The indicating apparatus of claim 1 in which said bellows is adjustable toward and from its switch.

4. Altitude and speed indicating means for aircraft which comprises a hollow cylindrical housing, a first closure plate at one end having an inlet for fluid under dynamic pressure, a second closure plate at the opposite end having an opening for static pressure and having a threaded engagement with the housing to permit adjustment inwardly and outwardly, an evacuated bellows mounted at one end on said second closure plate and extending axially in said housing, a helical spring in said bellows confined between its ends, a diaphragm spanning said housing near said first closure plate to form a dynamic pressure chamber in communication with the inlet for fluid under dynamic pressure, a flat spring in said dynamic pressure chamber and adjustably connected to the central part of said diaphragm, a pair of normally closed electric switches in said housing between said diaphragm and said bellows and connected in series, a connector extending axially from said bellows to open one switch as said bellows is distended and a connector extended axially from said diaphragm to the other switch to open said switch as said diaphragm is deflected under pressure in said dynamic pressure chamber.

References Cited in the file of this patent
UNITED STATES PATENTS

| | | |
|---|---|---|
| 1,769,673 | Blaschke | July 1, 1930 |
| 1,908,088 | Warner | May 9, 1933 |
| 2,008,627 | Place et al. | July 16, 1935 |
| 2,191,966 | Spangenberg | Feb. 27, 1940 |
| 2,555,990 | Newton | June 5, 1951 |